Reissued May 30, 1939

Re. 21,100

UNITED STATES PATENT OFFICE 21,100

PROCESS FOR THE PRODUCTION OF ELECTRICITY BY MEANS OF A FUEL CELL

Herbert H. Greger, Washington, D. C., assignor to a board of trustees composed of C. F. Hirshfeld, Detroit, Mich., F. G. Cottrell, Washington, D. C., and R. J. Gaudy, Chicago, Ill.

No Drawing. Original No. 1,963,550, dated June 19, 1934, Serial No. 646,940, December 9, 1932. Application for reissue May 17, 1938, Serial No. 208,493

20 Claims. (Cl. 136—86)

The present application is a continuation in part of application Serial No. 440,164 by Herbert H. Greger, filed March 29, 1930.

This invention relates to the production of electricity by direct combustion of a gaseous fuel in what is known as a "gas cell".

It is well known that an electromotive force is produced when oxygen and a combustible gas are in contact with suitable electrodes and a suitable electrolyte in such a manner that the gases cannot mix. If the electrodes are connected by a conductor an electric current will flow through the cell and the outer circuit.

The source of this current is the chemical energy, which is liberated by the oxidation of the combustible gas or of the fuel in general. The oxygen which is required for this combustion is transported by the electrolyte from the oxygen electrode to the gas electrode. It is obvious that only such electrolytes will be suitable for this transport of oxygen, which contain oxygen as a constituent, that is to say, which are suitable to produce anions containing oxygen, such as for instance sodium sulphate or sodium carbonate. Any kind of fuel gas may be used, such as hydrogen, carbonmonoxide, methane, coal gas, natural gas, water gas, etc.

The anion causes the oxidation of the fuel and liberates negative electrons to the gas electrode, imparting to this a negative charge. At the same time the cation liberates its positive charge on the oxygen electrode and is oxidized by the oxygen present at this electrode, thus leaving the composition of the electrolyte unchanged.

(1) $2Na^{+}+\frac{1}{2}O_2=Na_2O+2^{+}$
(on the oxygen electrode)

(2) (a) $CO_3^{--}+CO=2CO_2+2^{-}$
(b) $CO_3^{--}+H_2=CO_2+H_2O+2^{-}$
(on the gas electrode)

(3) $Na_2O+CO_2=Na_2CO_3$
(regeneration of $Na_2CO_3$)

It may be assumed that sodium carbonate is used as an electrolyte, forming $Na^{+}$-ions and $CO_3^{--}$-ions. The composition of the electrodes is of no importance in these considerations.

If CO or $H_2$ is passed to the gas electrode, this gas will have a reducing action on the $CO_3^{--}$-ion and a very small amount of this anion may be reduced. At the same time its electric charge will be liberated to the said gas electrode, imparting to the latter a negative charge. The charging of the electrode will cease after an equilibrium between the electrostatic energy on the electrode and the chemical energy of the gaseous fuel has been obtained. The corresponding process will take place on the oxygen electrode, the cation will be converted to sodium oxide and its positive charge liberated until equilibrium between the electrical and chemical energy is obtained. On discharging the electrodes by connecting them through a conductor, the processes on both electrodes will proceed as long as gas and oxygen are available. In oxidizing one gram-molecule of CO two faradays of electricity ($^{2}\times96540$ ampere seconds) are produced, while the voltage obtained depends on the free energy liberated during oxidation. This free energy varies somewhat with the temperature at which the process is operated.

In order to explain the process fully we must assume that on the gas electrode carbon dioxide is formed from the electrolyte, while on the oxygen electrode an equivalent amount of sodium oxide is produced. The sodium oxide is transferred to the gas electrode and there absorbs or reacts with the carbon dioxide, regenerating sodium carbonate. Also small amounts of sodium hydrate or hydroxide may be formed if steam is present on the gas electrode or when hydrogen is chiefly used as a fuel.

Various attempts have been made in the past to construct fuel cells for practical purposes. These attempts may be divided into two classes, those using aqueous solutions as an electrolyte and operating at room temperature (20° C.) while the other method use molten salts as an electrolyte and a temperature above the melting temperature of the latter. The fuel cell which I have invented belongs to the second class. In this class the most important conditions for operating and constructing a fuel cell, which requires careful attention, comprise:

(a) The fuel gas and the oxygen must react readily on the electrodes in order to become electromotively active. The tendency of these gases to react, which is very slight at ordinary temperature, increases however when the temperature of operation of the cell is increased.

(b) The composition of the electrolyte must not be changed through chemical reaction with the fuel gas, its products of combustion and oxygen. Also it must not be changed by physical factors, such as evaporation.

(c) The electrode material for the cell must neither be attacked by the fuel gas, its products of combustion and oxygen, nor by the electrolyte.

(d) The construction material for the cell must not be attacked by the electrolyte at the operating temperature of the cell.

(*e*) Absolute gas tightness is required in order to avoid any mixing of the fuel gas and oxygen.

Unfortunately the number of electrolytes which may be used with advantage at increased temperatures is very limited, especially by the requirements of item *b*. In previous processes alkali metal carbonates were used as an electrolyte, which gave satisfactory results with regard to the chemical stability of this compound. However the melting temperature of sodium and potassium carbonate is exceptionally high and even their mixture of 50 molar per cent of each substance melts at 704° C. A cell in which this electrolyte would be used would have a working temperature of nearly 800° C., a temperature which is too high to make the construction and operation of a large scale cell commercially feasible. The chief disadvantages involved in too high a temperature are:

(*a*) Metals which must be used in various places of the cell as electrodes, terminals, casings, pillars, etc., are subject to a high corroding action.

(*b*) The electrolyte has an excessive vapor pressure and its evaporation may have various undesired consequences, for instance the cell may dry out.

(*c*) The refractory material which must be used in any case in the construction of a fuel cell is subject to excessive corrosion by the electrolyte, except in the case where very pure magnesia bricks are used, which however are very expensive.

(*d*) The uniform and economical heating of the cell would provide many difficulties.

I have invented a new process for the production of electricity in gas cells, in which the above mentioned difficulties consequent upon too high a temperature are satisfactorily overcome. In this process an electrolyte of relatively low melting temperature is applied, whereby entirely new conditions for the construction and operation of fuel cells have been produced.

The new electrolyte consists of carbonates of the alkali and alkaline earth metals to which halide salts of the alkali and alkaline earth metals are added as a neutral solvent, which among other solvents gave the greatest satisfaction. It will be understood that numerous mixtures and combinations of these chemicals may be made.

Several examples of mixtures which are suitable for industrial application will give a clear idea of the usefulness of the new electrolyte:

| | In percent by weight | | | | | | | | |
|---|---|---|---|---|---|---|---|---|---|
| | I | II | III | IV | V | VI | VII | VIII | IX |
| $BaCO_3$ | 27.4 | 37.2 | | | 35.4 | | | | 9.1 |
| $CaCO_3$ | | | | | 4.8 | | | | |
| $Na_2CO_3$ | 10.0 | 10.4 | 22.8 | 13.5 | 9.9 | Added to I. | 31.3 | 42.4 | 28.4 |
| $K_2CO_3$ | 23.5 | 17.3 | 43.4 | 57.0 | 16.5 | | 40.7 | 26.2 | 37.0 |
| KF.2aq | 27.6 | 28.0 | 8.6 | | 26.6 | | | | |
| NaF | | | 4.2 | 8.1 | | | | | |
| $BaCl_2.2aq$ | 11.5 | | | | | | | | |
| KCl | | 7.1 | 21.0 | 21.4 | 6.8 | | 15.7 | 31.4 | 14.3 |
| KBr | | | | | | 1.0 | | | |
| NaCl | | | | | | | 12.3 | | 11.2 |
| Melting point | 475 | 475 | 510 | 510 | 465 | 470 | 557 | 557 | 547°C. |

In the above table the mixtures I and II, further III and IV, as well as VII and VIII are each identical because after melting they form mixtures that have the same melting point.

According to the law regulating the action of substances and of the exchangeability of ions in molten mixtures of salts it is possible to produce a certain definite salt mixture from various raw materials, provided that the quantities of the single ions that are introduced into the mixture are always the same. For instance, it may seem to be desirable by economic or other considerations to replace the amount of KCl in II by a corresponding amount of $BaCl_2$. This necessitates the reduction in the amount of $BaCO_3$ by an equivalent amount of barium-ion, while the equivalent amount of $CO_3$-ion is introduced as potassium-carbonate.

By means of these electrolyte mixtures it became possible to operate fuel cells at temperatures between the melting temperature of the electrolytes and about 700° C., which from practical reasons may be considered to be the upper limit at which industrial scale cells could be operated. The ordinary operating temperature for the process may be considered to be at about 550 to 650° C.

The new conditions for the construction and operation of the new fuel cell may be summarized as follows:

At the melting temperature of the electrolyte an evaporation of this practically does not exist and at the working temperature of the cell at about 550 to 650° C., the evaporation is negligible. Cheap metals, such as iron or calorized iron may be used with advantage as a construction material for the cell, its heating arrangements and for devices for heat exchange between incoming and outgoing gases. The high degree of heat economy which thus becomes possible without any appreciable difficulty, will contribute greatly to the efficiency of the process. Also the more common kinds of refractory material may be used without danger of corrosion.

The new electrolyte had to undergo very thorough tests, because it could be considered as satisfactory only if those substances which are admixed to the carbonates as a solvent, would not produce any chemical polarization in the cell and proved to be entirely neutral. That the admixed halide salts of the alkali and alkaline earth metals are really neutral may be seen in the fact that hydrogen and carbon monoxide gave almost the theoretical electromotive forces in a cell in which numerous different mixtures of the new electrolyte were tested together with oxygen-electrodes of nickel, nickel-chromium-steel and magnetite and gas electrodes of nickel, iron and carbon.

| Electromotive force at 600° C. | Observed voltage | Theoretical voltage |
|---|---|---|
| Hydrogen | 1.14 | 1.16 |
| Carbon monoxide | 1.04 | 1.06 |

The theoretical electromotive forces and those experimentally produced are sufficiently in agreement to prove that no other reaction than the oxidation of the fuel gas takes place. From this reason the electrolyte must be considered as specially suitable for being used in fuel cells.

Whereas I have described my invention by reference to specific forms thereof, it will be understood that many changes and modifications may be made without departing from my invention.

I claim:

1. The process of generating electricity which comprises introducing a fuel gas into a gas cell at the gas electrode thereof where it contacts an electrolyte comprising a fused mixture of a carbonate selected from the group consisting of alkali metal carbonates and alkaline earth metal carbonates in admixture with a halide selected from the group consisting of alkali metal halides and barium chloride, the melting point of the mixture being below 700° C., and reacts chemically therewith, releasing electrical charges which are imparted to said gas electrode and simultaneously introducing an oxygen-containing gas at the oxygen electrode where it contacts said electrolyte and reacts chemically therewith, releasing electrical charges which are imparted to said oxygen electrode, the said cell being operated at a temperature between the melting point of the electrolyte and 700° C.

2. The process of generating electricity which comprises introducing a fuel gas into a gas cell at the gas electrode thereof where it contacts an electrolyte comprising a fused mixture of a carbonate selected from the group consisting of alkali metal carbonates and alkaline earth metal carbonates in admixture with a potassium halide, the melting point of the mixture being below 700° C., and reacts chemically therewith, releasing electrical charges which are imparted to said gas electrode and simultaneously introducing an oxygen-containing gas at the oxygen electrode where it contacts said electrolyte and reacts chemically therewith, releasing electrical charges which are imparted to said oxygen electrode, the said cell being operated at a temperature between the melting point of the electrolyte and 700° C.

3. The process of generating electricity which comprises introducing a fuel gas into a gas cell at the gas electrode thereof where it contacts an electrolyte comprising a fused mixture of a carbonate selected from the group consisting of alkali metal carbonates and alkaline earth metal carbonates in admixture with a sodium halide, the melting point of the mixture being below 700° C., and reacts chemically therewith, releasing electrical charges which are imparted to said gas electrode and simultaneously introducing an oxygen-containing gas at the oxygen electrode where it contacts said electrolyte and reacts chemically therewith, releasing electrical charges which are imparted to said oxygen electrode, the said cell being operated at a temperature between the melting point of the electrolyte and 700° C.

4. The process of generating electricity which comprises introducing a fuel gas into a gas cell at the gas electrode thereof where it contacts an electrolyte comprising a fused mixture of a carbonate selected from the group consisting of alkali metal carbonates and alkaline earth metal carbonates in admixture with a halide selected from the group consisting of alkali metal halides and barium chloride, the mixture including two alkali metal carbonates and at least one alkali metal halide, and the melting point of the mixture being below 700° C., and reacts chemically therewith, releasing electrical charges which are imparted to said gas electrode and simultaneously introducing an oxygen-containing gas at the oxygen electrode where it contacts said electrolyte and reacts chemically therewith, releasing electrical charges which are imparted to said oxygen electrode, the said cell being operated at a temperature between the melting point of the electrolyte and 700° C.

5. The process of generating electricity which comprises introducing a fuel gas into a gas cell at the gas electrode thereof where it contacts an electrolyte comprising a fused mixture of a carbonate selected from the group consisting of alkali metal carbonates and alkaline earth metal carbonates in admixture with a potassium halide, the mixture including two alkali metal carbonates and the melting point of the mixture being below 700° C., and reacts chemically therewith, releasing electrical charges which are imparted to said gas electrode and simultaneously introducing an oxygen-containing gas at the oxygen electrode where it contacts said electrolyte and reacts chemically therewith, releasing electrical charges which are imparted to said oxygen electrode, the said cell being operated at a temperature between the melting point of the electrolyte and 700° C.

6. The process of generating electricity which comprises introducing a fuel gas into a gas cell at the gas electrode thereof where it contacts an electrolyte comprising a fused mixture of a carbonate selected from the group consisting of alkali metal carbonates and alkaline earth metal carbonates in admixture with a sodium halide, the mixture including two alkali metal carbonates and the melting point of the mixture being below 700° C., and reacts chemically therewith, releasing electrical charges which are imparted to said gas electrode and simultaneously introducing an oxygen-containing gas at the oxygen electrode where it contacts said electrolyte and reacts chemically therewith, releasing electrical charges which are imparted to said oxygen electrode, the said cell being operated at a temperature between the melting point of the electrolyte and 700° C.

7. The process of generating electricity which comprises oxidizing a fuel gas at the gas electrode of a gas cell by means of a carbonate contained in an electrolyte comprising a fused mixture of sodium carbonate, potassium carbonate, barium carbonate, sodium chloride, potassium chloride, barium chloride, sodium fluoride, and potassium fluoride, the melting point of the fused mixture being below 700° C., and simultaneously reducing oxygen gas by reaction with positively charged ions at the oxygen electrode of the said gas cell.

8. The process of generating electricity by oxidizing carbon monoxide and hydrogen at the gas electrode of a gas cell by means of a carbonate contained in a fused mixture of sodium carbonate, potassium carbonate, barium carbonate, sodium chloride, barium chloride, sodium fluoride and potassium fluoride the melting point of the fused mixture being below 700° C., and simultaneously reducing oxygen by reaction with positively charged ions at the oxygen electrode of the said gas cell.

9. The process of generating electricity which comprises introducing a fuel gas into a cell at the gas electrode thereof where it contacts an electrolyte comprising a fused mixture of a carbonate selected from the group consisting of alkali metal carbonates and alkaline earth metal carbonates and a halide of the group consisting of alkali metal halides and barium chloride, the mixture including two alkali metal carbonates and at least one alkali metal halide and having a melting point below 700° C., and reacts chemically therewith, releasing electrical charges which are imparted to said gas electrode and simultaneously introducing an oxygen containing gas at the oxygen electrode where it contacts the aforesaid electrolyte and reacts chemically therewith, releasing electrical charges which are imparted to said oxygen electrode.

10. The process as set forth in claim 9, in which the fuel gas is carbon monoxide and hydrogen.

11. The process as set forth in claim 9 in which the electrolyte comprises a fused mixture of sodium carbonate, potassium carbonate, barium carbonate, sodium chloride, potassium chloride, barium chloride, sodium fluoride and potassium fluoride.

12. The process as set forth in claim 1, characterized in that the fused mixture constituting the electrolyte has a melting point below 600° C.

13. The process as set forth in claim 1, characterized in that the fused mixture constituting the electrolyte has a melting point below 500° C.

14. In a fuel cell of the class described, an electrolyte comprising a fused mixture of a carbonate selected from the group consisting of alkali metal carbonates and alkaline earth metal carbonates in admixture with a halide selected from the group consisting of alkali metal halides and barium chloride, the said mixture having a melting point below 700° C.

15. In a fuel cell of the class described, an electrolyte comprising a fused mixture of a carbonate selected from the group consisting of alkali metal carbonates and alkaline earth metal carbonates in admixture with a halide selected from the group consisting of alkali metal halides and barium chloride, the said mixture having a melting point below 600° C.

16. In a fuel cell of the class described, an electrolyte comprising a fused mixture of a carbonate selected from the group consisting of alkali metal carbonates and alkaline earth metal carbonates in admixture with a halide selected from the group consisting of alkali metal halides and barium chloride, the said mixture having a melting point below 500° C.

17. In a fuel cell of the class described, an electrolyte comprising a fused mixture of a carbonate selected from the group consisting of alkali metal carbonates and alkaline earth metal carbonates and a halide of the group consisting of alkali metal halides and barium chloride, the mixture including two alkali metal carbonates and at least one alkali metal halide, said mixture having a melting point below 700° C.

18. In a fuel cell of the class described, an electrolyte comprising a fused mixture of a carbonate selected from the group consisting of alkali metal carbonates and alkaline earth metal carbonates and a potassium halide, the mixture including two alkali metal carbonates, said mixture having a melting point below 700° C.

19. In a fuel cell of the class described, an electrolyte comprising a fused mixture of a carbonate selected from the group consisting of alkali metal carbonates and alkaline earth metal carbonates and a sodium halide, the mixture including two alkali metal carbonates, said mixture having a melting point below 700° C.

20. In a fuel cell of the class described, an electrolyte comprising a fused mixture of sodium carbonate, potassium carbonate, barium carbonate, sodium chloride, potassium chloride, barium chloride, and potassium fluoride, the melting point of the fused mixture being below 700° C.

HERBERT H. GREGER.